Figure 1:
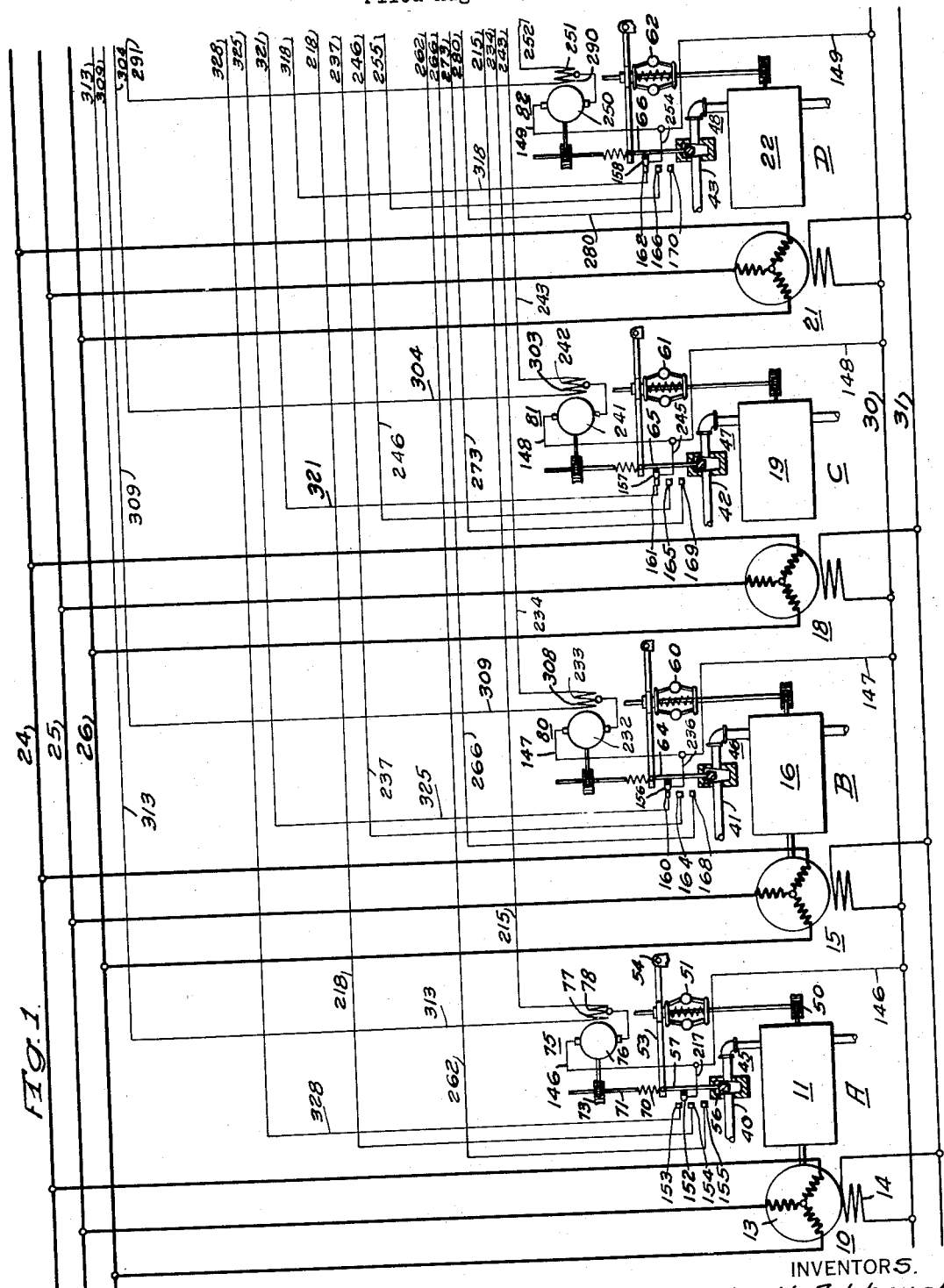

Aug. 1, 1933.  J. H. ASHBAUGH ET AL  1,920,544

AUTOMATIC REGULATING SYSTEM

Filed Aug. 11, 1931   2 Sheets-Sheet 1

WITNESSES.
E. A. McCloskey.
C. F. Bryant

INVENTORS.
John H. Ashbaugh
and Ralph A. Geiselman.
BY Franklin E. Hardy
ATTORNEY

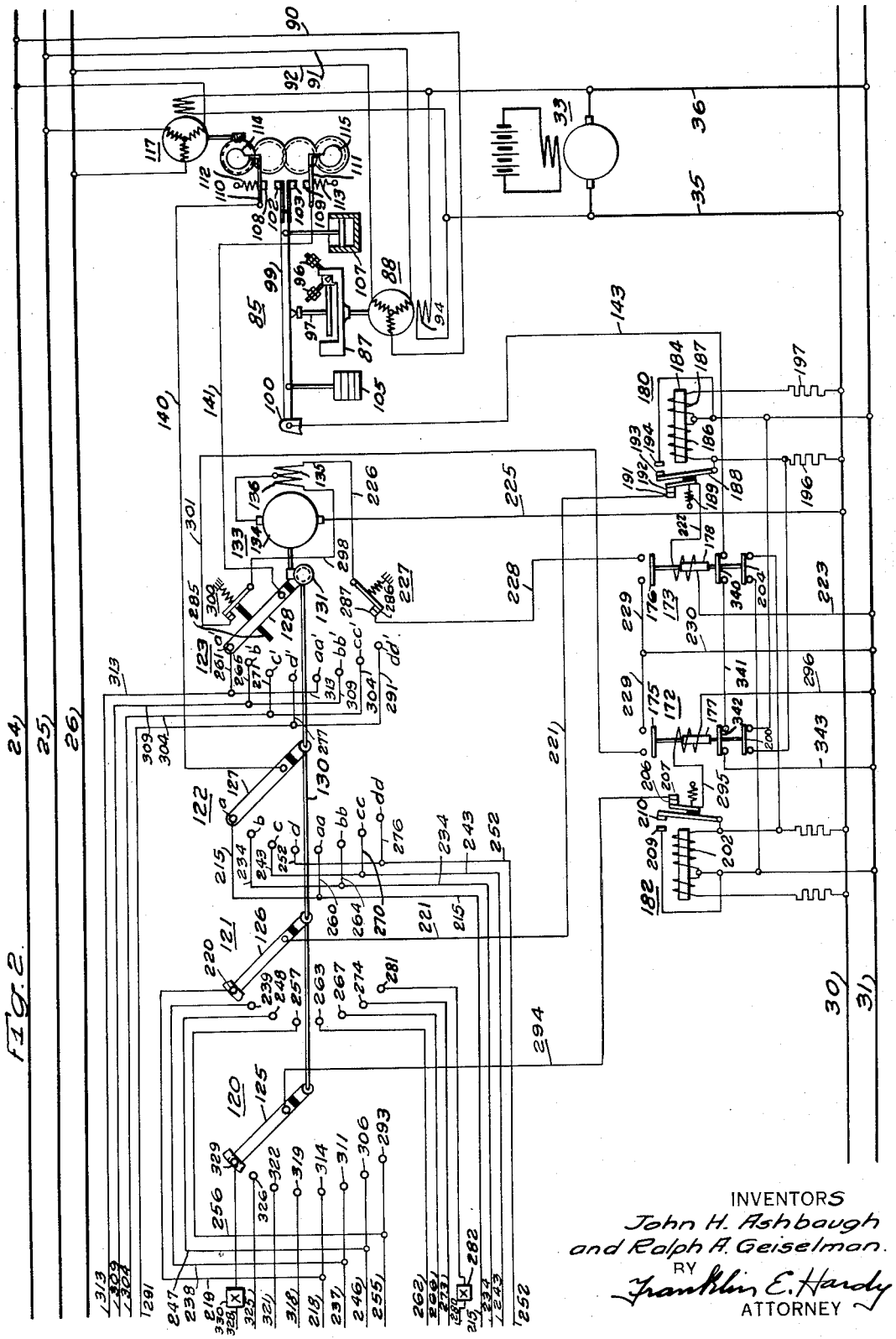

Patented Aug. 1, 1933

1,920,544

UNITED STATES PATENT OFFICE 1,920,544

AUTOMATIC REGULATING SYSTEM

John H. Ashbaugh, Longmeadow, Mass., and Ralph A. Geiselman, Wilkinsburg, Pa., assignors to Westinghouse Electric & Manufacturing Company, a Corporation of Pennsylvania Application August 11, 1931. Serial No. 556,348

22 Claims. (Cl. 290—4)

Our invention relates to control-transfer systems and has particular relation to systems for automatically transferring, in accordance with a predetermined schedule, the control of a regulator from one to another of a plurality of parallel-operated electrical machines.

One application to which the transfer system of our invention is especially well suited is the frequency regulation of an electrical-generating station or system comprising a plurality of parallel-connected generators, each of which is driven by a separate prime mover. In such a system, it is general practice to provide each prime moved with a speed-responsive governor which acts upon the input-control valve in such manner that the speed and frequency of the driven generator will be maintained within limits which approximate the desired value.

To obtain the high degree of accuracy which is required, a frequency regulator is usually utilized. Such a regulator may act to vary the calibration or response characteristics of one or more of the prime-mover governors in such a manner that the speed of the several parallel-operated generators will be closely maintained at the value necessary to give the desired frequency.

In practice, it is found that it is unnecessary to thus adjust the calibration of all of the generator-prime-mover governors since ordinarily a frequency regulator acting on a single machine in a parallel-connecting group will be capable of controlling the frequency of all of the machines. It is essential, however, that this regulator-controlled machine operate at some intermediate value of load in order that it may be capable of load adjustment in either direction throughout the substantial range which may be necessary to compensate for and to correct deviations in the system frequency.

In a system such as described, the prime-mover-governor characteristics are such that when the system frequency is maintained constant, as by means of a frequency regulator acting on a single machine, the load carried by the generators not controlled by the regulator will remain practically unchanged during load fluctuations of the generator which the regulator controls. Thus, when the parallel-connected generators are carrying a given load, a change in the load demand affects only the regulator controlled machine in any substantial degree. If this change is of such magnitude as to cause the machine to operate at either the upper or lower limit of its capacity, any further change in the given direction will render the regulator ineffective in maintaining the frequency. Further changes in load demand will then act to vary the frequency from the desired value by an amount sufficient to cause the prime-mover governors of the remaining generators to act upon the input-control means in a manner that the new load demand will be met.

To extend the range of regulation beyond that set by the load limits of a single machine, means for transferring the regulator control to one of the other generators when the load carried by the first reaches a given maximum or minimum limit may be utilized. If the transferring scheme is capable of progressive shifting of regulator control among all of the machines in the system, frequency regulation over a maximum range of load-demand fluctuations is obtainable.

Operating experience further indicates that the greatest economy of operation of a plurality of parallel-connected generators is obtainable when the sequence of frequency-regulator-control transfer is caused to take place according to a predetermined program or schedule, the exact nature of which may vary in accordance with the respective characteristics of each of the several machines involved.

Our invention is directed to a scheme for automatically effecting the transfer of regulator control among a plurality of parallel-operated machines in accordance with the principles and considerations above outlined.

It is an object of our invention, therefore, to provide control-transfer means capable of automatically shifting the control of a regulator from one to another of a plurality of parallel-operated electrical machines in accordance with a predetermined schedule, the individual transfer operations in which schedule are initiated by predetermined conditions of the machines.

It is a further object of our invention to provide a transfer system of the type described which is particularly applicable to the frequency regulation of a multi-generator power system.

Our invention, together with additional objects and advantages thereof, will best be understood from a description of a specific embodiment thereof when taken in conjunction with the accompanying drawings, in which:

Figures 1 and 2, when considered together, comprise a diagrammatic view of apparatus and circuits arranged in accordance with one preferred form of our invention which is disposed to automatically effect the transfer of control of a frequency regulator from one to another of four alternating-current generators disposed to supply energy to a common power circuit.

Referring to the drawings, it will be observed that the circuit conductors terminating at the right-hand side of Fig. 1 are continued at the left-hand side of Fig. 2 in a manner that the apparatus illustrated in Fig. 1 is interconnected with the apparatus illustrated in Fig. 2 in the manner shown. In the explanation and description which is to follow, like reference numerals in the two separate figures will designate conductors which are common to both figures and which continue from one to the other.

In Fig. 1, we have illustrated four separate and similar generating units which are designated generally by A, B, C and D, respectively. Generating unit A comprises an alternating-current generator 10 disposed to be driven by a prime mover 11. Generator 10 is illustrated as being of the three-phase type, comprising armature windings 13 and an exciting-field winding 14.

Similarly, generating unit B comprises a generator 15 and a prime mover 16, unit C a generator 18 and a prime mover 19, and unit D a generator 21 and a prime mover 22.

The armature windings of the several generators named are connected, in the manner shown to a three-phase power circuit designated by conductors 24, 25 and 26, at the top of the figures. The generator field windings are illustrated as being energized by direct current derived from conductors 30 and 31, of positive and negative potentials, respectively. Conductors 30 and 31 may be supplied from any suitable energy source, such as a direct-current generator 33 (shown in Fig. 2), respectively connected thereto by means of conductors 35 and 36.

Prime movers 11, 16, 19 and 22 may be supplied with motive fluids by means of conduits 40, 41, 42 and 43, respectively, from any suitable source (not shown). To control the flow of motive fluid, suitable control valves, shown respectively at 45, 46, 47 and 48, are inserted in the conduits named.

The position of the movable member of each control valve is determined by a speed-responsive governor mechanism in well known manner. As illustrated, prime mover 11, for example, drives by suitable mechanical means 50, fly-ball mechanism 51 of well known type, which transmits governing movements to arm 53. Arm 53 may be pivoted at one end 54 and connected at the other end to the movable element 56 of input-control valve 45, by means of member 57. An increase in speed of prime mover 11 thus acts to move lever 53 downwardly and to close valve 45, while a decrease in speed of the prime mover acts in a similar manner to open valve 45 and to thus admit more motive fluid.

In a similar manner, prime movers 16, 19 and 22 are provided with fly-ball mechanisms 60, 61 and 62, respectively, which act to control the positions of valve-adjusting members 64, 65 and 66 in accordance with the speed of the prime movers.

The governing mechanism so far described is capable of maintaining the speed of the generating unit within rather broad limits only, and hence is not sufficiently sensitive to effect the close frequency regulation of the driven generators which in practice is required. To obtain the higher precision of speed and frequency control, each of the prime mover governors is provided with calibrating or response-adjusting means.

In the case of prime mover 11, these response-adjusting means are shown as comprising a tension spring 70 disposed to exert an upward pull upon the left end of lever 53. The magnitude of this pull may be adjusted by shifting the vertical position of spring-securing member 71, illustrated in the form of a threaded rod which cooperates with an interiorly threaded gear wheel 73. Rotation of gear wheel 73 moves member 71 up or down to effect a change in tension of the spring.

It will be apparent that an increase in tension of spring 70 will tend to increase the speed at which governor 51 will maintain prime mover 11, while a decrease in tension will cause the prime mover to correspondingly lower its speed since the response characteristics of the governor are dependent upon the force which the fly-ball mechanism must overcome in effecting a closure of the input valve 45.

To rotate gear wheel 73, a motor 75 is provided. This motor may be of any suitable type capable of reversible operation. As shown, it comprises an armature winding 76 and a field winding made up of two separate and oppositely wound sections 77 and 78. Energization, from a direct-current source, of armature 76, through field winding 77 causes motor 75 to rotate in a direction which tends to raise the speed of prime mover 11, while energization of the motor through field winding 78 causes it to rotate in a speed-lowering direction.

Prime movers 16, 19 and 22 are likewise provided with similar governor calibrating means which include motors 80, 81 and 82, respectively. These means operate in a manner comparable to that explained for the biasing member 70 and adjusting motor 75 of prime mover 11.

To control the governor-adjusting motors of the generating units, a frequency regulator 85, shown in Fig. 2, is employed. Regulator 85 may be of any suitable type and is illustrated as being of the well known speed-responsive-centrifugal-element, step-by-step operation construction. The frequency-change responsive element 87 is driven by a synchronous motor 88 energized from the main power circuit conductors 24, 25 and 26, by means of connecting conductors 90, 91 and 92. An exciting field winding 94 is connected for energization from direct-current source conductors 35 and 36 in the manner shown.

Element 87 is provided with fly-ball members 96, which are mechanically linked with a vertically movable member 97 in such a manner that an increase in rotative speed of element 87 causes member 97 to move upwardly, while a decrease in speed allows a downward movement thereof. This movement is transmitted to a contact-carrying member 99 which is pivoted at the left-hand end at 100 and which carries, on the right-hand end, contact members 102 and 103, spring supported in the manner shown. A weight 105 exerts a downward force on member 99 to oppose the upwardly acting force of member 97. A dash-pot damping element 107 is utilized to prevent rapid movement of the member 99.

In cooperative relation with the movable contact members 102 and 103 are disposed contact members 108 and 109, respectively, which are carried by supporting members 110 and 111, each of which is pivoted at the left-hand end thereof in the manner shown. The right-hand ends of members 110 and 111 are caused, by means of tension springs 112 and 113 to bear against cam members 114 and 115, respectively. These cam members are disposed to be rotated by a motor 117 in such manner that regulator contact members 108 and 109 move towards and away from each other at regularly spaced time intervals.

In operation of regulator 85, normal frequency of the voltage acting in power-circuit conductors 24, 25 and 26 rotates motor 88 at such speed that element 97 is maintained at the intermediate or neutral vertical position illustrated, in which contact elements 102 and 103 do not engage with elements 108 or 109. A decrease in frequency allows contact-carrying member 99 to move downwardly to a position in which contact member 103 is caused to engage member 109 at regularly spaced time intervals, the duration of which engagement periods varies with the displacement from the neutral position of member 99. Likewise, an increase in frequency of the power circuit voltage causes member 99 to be raised to a position in which contact member 102 engages the member 108 at regular time intervals, the duration of these engagement periods likewise being dependent upon the amount of upward displacement of member 99.

As has been mentioned, frequency regulation of the entire system comprising generating units A, B, C and D may be attained by disposing the regulator 85 to control the governor-adjusting motor of but one of these units. However, should this regulator-controlled unit be required to change its load beyond predetermined limits in order to effect the desired correction in frequency, the regulator control is transferred to one of the other generating units. As this second unit may likewise be caused to reach a predetermined limit in its load fluctuations, further transfer to another unit may similarly be required for reasons which have already been explained. To effect such transfer in accordance with a predetermined program, or schedule, the control-transfer system of our invention is utilized.

The modification of our invention illustrated in Figs. 1 and 2 is disposed to effect transfer of the frequency regulator 85 among generating units A, B, C and D in accordance with a predetermined program when the load demand on, or frequency of the voltage acting in, the main power circuit supplied by these units changes. The particular program which has been selected, for explanatory purposes, is as follows:

Assuming that all of the units A, B, C and D are operating at full capacity, the regulator 85 is disposed to be in control of unit A. A decrease in power demand causes the frequency to tend to rise and this causes the regulator to decrease the power output of unit A. When the output has reached a predetermined intermediate value, the regulator control is transferred to unit B. Assuming that the demand continues to decrease, the output of this unit is also lowered and when it attains a predetermined intermediate value, regulator control is transferred to unit C. Continuation of the demand decrease lowers the output of unit C and when a predetermined intermediate value has been attained, regulator control is transferred to unit D. A decrease in output of unit D to the given intermediate value transfers regulator control back to unit A. Decrease in the output of unit A to a given low value results in a transfer of regulator control to unit B. Decrease in unit B output to a given low value transfers regulator control to unit C. When the output of unit C reaches a given low value, control is then transferred to unit D, where it remains until a fall in frequency, caused for example by an increase in load demand of a predetermined value, is effected.

For this last-named condition, all of the units A, B, C and D are operating at low capacity, and the regulator is in control of unit D.

Assuming that the power demand on the circuit supplied by the generating units now increases the frequency regulator acts to raise the output of unit D. When the output of this unit attains a given intermediate value, regulator control is transferred to unit C. Continuing increase in the power demand causes the output of unit C to be raised and when a given intermediate value is reached, regulator control is transferred to unit B. Assuming that the increase continues, transfer is then progressively effected to unit A where the regulator control remains until unit A reaches a given intermediate output value, at which time control is transferred to unit D. When unit D is supplying an output corresponding to its full capacity, or other comparable predetermined value, transfer is effected to unit C which is brought up to full capacity, thence to unit B, which, when fully loaded, causes the regulator control to be transferred to unit A. It will be recognized that this last-named condition is the one originally assumed at the start of the explanation of the transfer program.

It will be understood that while only four generating units are considered in the scheme illustrated, the transfer system of our invention may be applied to any system employing any number of generators or other electrical machines. Also, while the particular scheme shown provides that the regulator act upon a single machine only it will be understood that if desired two or more machines may be controlled in a parallel manner as a single unit, in which case the transfer operations may shift the regulator control among different groups of machines so disposed in unit-control relation. Hence, the term unit is intended to designate either a plurality of parallel-controlled machines or merely a single machine. To simplify the drawings, only a single machine has been shown for each unit in the particular embodiment described.

Likewise, while a frequency regulator is illustrated as the device whose control is to be transferred, it will be apparent that our invention may be combined with regulators of other types, such as load regulators for example. Similarly, while one given program of transfer is shown and described, it will be apparent that other programs of transfer may likewise be effected through the use of the basic transfer system of our invention. An appreciation of these considerations will be helpful in understanding the more detailed operative description of the system shown in Figs. 1 and 2 which is to follow.

Initiation of the transfer operations may be effected in any suitable manner by means responsive to the output of each of the several generating units involved. Thus, for example, such means may take the form of load-responsive contact-making devices associated with each generator, or of contact-making mechanisms operated in accordance with the position of the prime-mover input-control valves of each of the unit machines. In the system illustrated, these latter means are utilized.

On the movable member of each input-control valve, we mount a contact member in cooperative relation with which are disposed a plurality of stationary contact members so positioned that they are selectively engaged by the first-named member as the valve is adjusted from the open to the closed position. Electrical connections are made from these contact members to the control circuits of operation-transfer effecting means.

Thus in the case of generating unit A, a contact member 152 is mounted upon movable element 57 of prime-mover input-control valve 45, and in cooperative relation with this member are disposed stationary members 153, 154 and 155. As shown, the positioning of these last-named members is such that when valve 45 is in the completely open position, contact member 152 engages member 153, while when the movable element of the valve is in an intermediate or partially closed position, member 152 engages member 154, and when the valve is in a nearly closed position, member 152 engages member 155.

In a similar manner, the movable element of prime-mover input-control valves of generating units B, C and D are provided with contact members 156, 157 and 158, respectively, which, in the completely open positions of the valves illustrated, engage stationary contact members 160, 161 and 162, respectively, while in the partially closed positions of the valves respectively engage members 164, 165 and 166, and, further in the nearly closed positions of the valves engage members 168, 169 and 170, respectively.

In the form of our invention illustrated, we utilize four parallel-operated motor-driven switching devices, shown generally at 120, 121, 122 and 123 in the form of face-plates. Each of these devices or face-plates comprises a plurality of stationary contact points which are selectively engaged by a movable contact-making arm. These arms are respectively illustrated at 125, 126, 127 and 128.

All of these movable arms are mechanically connected to a common shaft 130 which carries a gear wheel 131 which is disposed to be rotated by a motor 133.

Motor 133 may be of any suitable type capable of reversible operation, and is illustrated as comprising an armature winding 134 and two oppositely-wound field windings 135 and 136. Energization, from a direct-current source, of the armature winding 134 through field winding 135 causes the motor to rotate in a direction which moves the several face-plate contact making arms in a counter-clockwise direction, while energization of the armature winding through field winding 136 moves the face-plate mechanisms in the opposite or clockwise direction.

Contact-making arms 127 and 128 of face plates 122 and 123 are connected to frequency regulator 85 by means of conductors 140 and 141, respectively. It will be observed that engagement of contact members 102 and 108 of the frequency regulator connects conductor 140 to the negative control conductor 31, contact-carrying member 99 of the regulator being joined to control conductor 31 by a circuit which includes a conductor 143, a relay contact member 340, conductor 341, a second relay contact member 342, and conductor 343. The relay contact members mentioned are for a purpose to be later explained. In similar manner, engagement of contact members 103 and 109 of the regulator energizes conductor 141 with a negative potential. To the several stationary contact points of face-plates 122 and 123 are brought connecting conductors from the field windings of governor-adjusting motors 75, 80, 81 and 82, the speed-lowering sections being connected to face-plate 122 and the speed-raising sections being connected to face-plate 123.

Thus the connections from field winding sections 77 and 78 of governor-adjusting motor 75 of generating unit A are brought to contact points 80 $a$ and $a'$ of face-plates 122 and 123. Similarly, the field winding sections of motor 80 of generating unit B are brought to contact points $b$ and $b'$, those of motor 81 of unit C to $c$ and $c'$, and those of motor 82 of unit D to $d$ and $d'$. For reasons to be later explained, four additional contact points are provided with each face-plate for parallel connection with the four points already named. Thus in the case of face-plate 122, point $aa$ is joined with point $a$, $bb$ with point $b$, $cc$ with point $c$, and $dd$ with point $d$. Similarly on face-plate 123 additional contact points $aa'$, $bb'$, $cc'$ and $dd'$ are provided.

It will be observed that the armature windings of the governor-adjusting motors of generating units A, B, C and D are connected to the positive control conductor 30 by means of conductors 146, 147, 148 and 149, respectively. Thus, there may be completed for each motor an energizing circuit which extends from positive conductor 30, through the armature winding of the motor, one section of the motor-field winding, one of the face-plates 122 or 123, and one set of selectively engaged contacts of regulator 85 back to the negative control conductor 31.

To control the operation of face-plate adjusting motor 133, a pair of relays 172 and 173 are utilized. Each of these relays comprises a main contact member, shown at 175 and 176, respectively, which, when actuated upwardly, engages a pair of cooperating contact elements in a manner to complete an energizing circuit for the motor. Actuation of each relay is effected by energizing a winding associated with a movable plunger element of the relay. These plunger elements are indicated at 177 and 178, respectively, for the two relays named.

Energization of the motor-control relay windings is effected by the engagement of a set of valve-operated contact members of one of the generating units A, B, C or D, selection of the particular set of members which will be effective being determined by the position of the contact-making arms 125 and 126 of the motor-operated face plates 120 and 121. Thus, energization of motor-control relay 173 is effected by a completion of a circuit which extends from positive control-circuit conductor 30 through a pair of the valve-actuated contact members of generating unit A, B, C or D, face-plate 121, a set of normally-closed contact members carried by a time-delay relay 180, and the winding of relay 173 back to negative control-circuit conductor 31.

Actuation of relay 173 energizes motor 133 in a manner that the face-plate assemblies are all advanced in a counter-clockwise or decreasing-load-demand direction.

Similarly, energization of motor-control relay 172 is effected by the completion of a circuit which extends from positive control-circuit conductor 30, through a set of valve-operated contact members of generating unit A, B, C or D, face-plate 120, engaged contact members of a time-delay relay 182, and the winding of relay 172 back to negative control-circuit conductor 31.

Actuation of relay 172 energizes motor 133 in a manner that it moves the four parallel-operated face-plates in a clockwise or increasing-load-demand direction.

The time-delay relays 180 and 182 mentioned are utilized for the purpose of preventing the reversal of a control-transfer operation until after a sufficient time has elapsed for the frequency regulator to exert a stable control upon the newly assigned generating unit. These relays may be of any suitable type having instantaneous opening, time-delay reclosing characteristics, the necessity of which will be further made evident.

As illustrated, relay 180 comprises a magnetic core member 184, with which are associated two separate and differentially related magnetizing windings 186 and 187. Winding 186, which is known as the main or operating winding, comprises a larger number of magnetizing ampere turns than does neutralizing winding 187. A pivotally mounted armature member 188 is normally biased in the position shown by a spring member 189. The relay armature 188 carries two separate contact members 192 and 193 which are respectively disposed to cooperate with stationary contact members 191 and 194 in the manner shown.

In operation of relay 180, windings 186 and 187 are connected to a direct-current energizing source, as to conductors 30 and 31, through circuits each of which includes a current-limiting resistor, these resistors being shown at 196 and 197, respectively. The placement of a short-circuit around winding 186 leaves only the magnetizing effect of winding 187 which is of insufficient force to attract armature 188 to core member 184. However, the removal of the short-circuit about winding 186 allows its magnetizing force to become effective, which force immediately overcomes the opposing force of winding 187 and builds up sufficient flux in core member 184 to move armature 188 towards the core and thus disengage contact members 191 and 192 and engage contact members 193 and 194.

This actuating operation proceeds without appreciable time delay. However, a reestablishment of the short-circuit about main winding 186, in addition to removing the magnetizing current, causes this winding to act as a magnetic damper and limits the rate at which the flux in core member 184 dies down even though the decrease is hastened by the action of neutralizing winding 187. Consequently, a time delay is required before biasing member 189 can withdraw armature 188 from the attracted position. In practice, this time delay may be made of the order of several seconds.

It will be seen that an auxiliary contact-member 200 of motor-control relay 172 normally sets up a short-circuit about main winding 186 of time-delay relay 180. Actuation of relay 172 removes this short-circuit, causing relay 180 to move armature 188 to the actuated position in which contact members 191 and 192 in the circuit of the widing of motor-control relay 173 are disengaged and members 193 and 192 are engaged to reestablish the short-circuit about the main winding 186. After a time delay, following each operation, armature 188 of relay 180 thus returns to the position illustrated in the drawings.

Time-delay relay 182 is shown as of similar construction as relay 180, the main operating winding 202 thereof being normally short-circuited by an auxiliary contact member 204 of motor-control relay 173, while the normally-engaged contact members 206 and 207 are disposed in the energizing circuit of motor-control relay 172. The normally-engaged contact members 209 and 210 are disposed to reestablish, upon engagement, a short-circuit about operating winding 202 of the relay.

As illustrated, the frequency regulator 85 is disposed to directly complete, upon closure of its contacts, an energizing circuit for the governor-adjusting motor of one of the generating units. It will be understood that should it be desired relays may be interposed between the regulator and each of the several motors in a well known manner. Since such relays do not in themselves form a part of this invention, no showing of them is made in order that undue complication of the drawings may be avoided.

To deenergize the regulator control circuits during transfer operations, so that undesirable arcing at the transfer-switch-device contacts may be prevented, the relay-contact members 340 and 342, previously mentioned, are disposed upon the motor-control relays 173 and 172 in the manner shown. It will be seen that actuation of either one of these relays, which occurs during a transfer operation to effect energization of transfer-device-operating motor 133, interrupts the energizing-circuit for the governor-adjusting motor which might at the time be completed by regulator 85.

The equipment utilized by the transfer system shown in Figs. 1 and 2 having been generally described, attention may now be directed to the manner in which the entire system functions.

In operation of the transfer scheme arranged as shown and described, let it be assumed, for purposes of explanation, that generating units B, C, and D are operating at full rated capacity, and that the frequency regulator 85 is in control of generating unit A, which unit is assumed to be operating at a rate slightly below its full capacity. For such a condition, the contact making arms of face-plates 120, 121, 122 and 123 will occupy the particular positions shown in Fig. 2.

A decrease in the load demand upon the main power circuit, represented by conductors 24, 25 and 26, tends to raise the frequency of the system. This rise in frequency, acting upon frequency regulator 85 moves contact carrying arm 99 upwardly and causes contact member 102 to engage with member 108, to complete a circuit for energizing governor-adjusting motor 75 of generating unit A in a frequency-and load-lowering direction. This circuit extends from positive conductor 30, through conductor 146, armature winding 76 and field winding 78 of motor 75, conductor 215, contact point a and contacting-making arm 127 of face plate 122, conductor 140, engaged contact members 108 and 102 and contact-carrying member 99 of regulator 85, conductor 143, contact member 340 of motor-control relay 173, conductor 341, contact member 342 of motor-control relay 172, and conductor 343 back to negative conductor 31.

Thus energized, motor 75 adjusts the governor of prime mover 11 in the frequency-or-speed-lowering direction. The effect of this adjustment is to decrease the power output of generator 10 and allow the frequency of the entire system to correspondingly decrease. Assuming that the load demand on the main power circuit continues to decrease, governor-adjusting motor 75 will continuously close the input-control valve 45.

When the closure has proceeded sufficiently, contact member 152, carried upon member 57 of the control valve, engages intermediate-load contact member 154, and a transfer-operation circuit is thereby established. This circuit, which energizes motor 133 of Fig. 2 in a manner that the face-plate contact-making arms will be moved one step in a counter-clockwise direction, extends from positive conductor 30, through conductors 146 and 217, engaged contact members 152 and 153 of input-control valve 145, conductors 218, and 219, contact point 220 and contact-making arm 126 of face plate 121, conductor 221, engaged contact members 191 and 192 of time-delay relay 180, conductor 222, the winding of motor-control relay 173 and conductor 223 back to negative conductor 31.

Thus energized, relay 173 is caused to actuate its movable members upwardly, completing an energizing circuit for face-plate-operating motor 133 which extends from positive conductor 30, conductor 225, the armature winding 134, and field winding 135 of motor 133, conductor 226, contact members of a normally-closed limit switch 227, conductor 228, contact members 176 of relay 173 and conductors 229 and 230 back to negative conductor 31.

Thus energized, motor 133 rotates in a direction to move contact-making arms of the face plates in a counter-clockwise direction. This movement continues until contact arm 126 leaves stationary contact member 220 of face plate 121, at which time the circuit for energizing the winding of relay 173 is interrupted. This relay then moves to its lower position and by deenergizing motor 133 causes the face-plate operation to discontinue.

The contact-making arm 126 is so shaped that it will engage the succeeding contact point before its engagement with the one form which it is moving is interrupted. Such being the case, the face-plates are stopped in a position in which the contact-making arms all engage adjacent contact points. It will be observed that the construction of contact-making arm 125 of face plate 120 is similar to that already described for face plate 121, and for a similar reason.

In the new position, contact-making arms 127 and 128, of face plates 122 and 123, respectively, engage stationary contact points $b$ and $b'$,—thus the control of regulator 85 has been transferred from generating unit A to generating unit B. Likewise, contact-making arms 125 and 126 of face plates 120 and 121 set up, in the new position, transfer-control circuits which are completed by the engagement of a set of contact members carried by the input-control valve of generating unit B.

Assuming that the load demand from the main power circuit continues to decrease, regulator 85 will complete a circuit for operating governor-adjusting motor 80 of unit B in a speed-and-load-lowering direction, which circuit extends from positive conductor 30, through conductor 147, armature winding 232 and field winding 233 of motor 80, conductor 234, contact point $b$ and contact-making arm 127 of face plate 122, conductor 140, engaged contact members 108 and 102 of regulator 85, conductor 143, contact member 340, conductor 341, contact member 342, and conductor 343 back to negative conductor 31.

Thus energized, motor 80 acts to lower the speed and hence the load carried by the generating unit B. Assuming that this action of bringing the frequency down to the desired value continues until input control valve 46 of generating unit B has been closed to the intermediate position, a control-transfer circuit is established by engagement of contact members 156 and 164 of valve 46 for effecting a transfer of regulator control to generating unit C. This circuit extends from positive conductor 30, through conductors 147 and 236, engaged contact members 156 and 164, conductors 237 and 238, contact point 239, contact-making arm 126 of face plate 121, conductor 221, engaged contact members 191 and 192 of time-delay relay 180, conductor 222, the winding of motor-control relay 173, and conductor 223 back to negative conductor 31.

Thus energized, relay 173 actuates contact member 176 upwardly to complete an energizing circuit for motor 133, which circuit has already been traced. Motor 133 moves the contact-making arms of the face plates to the succeeding or third-from-the-top contact points, where further movement is arrested.

In this position, the regulator is in control of generating unit C, and a new transfer-control circuit has been set up which may be completed by the engagement of a pair of valve-operated contacts of unit C.

Assuming the load demand from the main power circuit continues to decrease, regulator 85 acts to lower the prime-mover input of unit C by energizing governor-adjusting motor 81 through a circuit which extends from positive conductor 30, conductor 148, armature winding 241 and field winding 242 of motor 81, conductor 243, contact point $c$ and contact-making arm 127 of face plate 122, the frequency regulator 85 and thence to negative conductor 31 through the circuit before traced.

When the control valve of prime mover 19 is closed to the intermediate position, in which contact element 157 engages element 165, there is completed a circuit for effecting a transfer of regulator control to unit D. This circuit extends from positive conductor 30, conductors 148 and 245, engaged contact members 157 and 165, conductors 246 and 247, contact point 248 and contact-making arm 126 of face plate 121 and thence to negative conductor 31 through the winding of motor-control relay 173 included in the circuit which has been traced hereinbefore.

Relay 173 energizes motor 133 and causes the contact-making arms of the face plates to be shifted to the succeeding position in a counter-clockwise direction. In this new or fourth position, regulator 85 is disposed to control generating unit D.

Assuming the load demand continues to decrease, the frequency regulator energizes governor-adjusting motor 82 in a frequency and load lowering direction by completing a circuit which extends from positive conductor 30, through conductor 149, armature winding 250 and field winding 251 of motor 82, conductor 252, contact point $d$ and contact-making arm 127 of face plate 122, and regulator 85 back to negative conductor 31. Motor 82 is then caused to adjust the governor of prime mover 22 in the speed-and-load-lowering direction.

When the input-control valve 48 of unit D is moved to the intermediate closed position in which contact member 158, carried by the valve, engages member 166, there is completed a circuit for effecting the transfer of regulator control back to generating unit A. This circuit extends from control conductor 30, through conductors 149 and 254, contact members 158 and 166, conductors 255 and 256, contact point 257 and contact-making arm 126 of face plate 121, and the winding of motor control relay 173 to negative conductor 31.

Energization of relay 173 acts upon motor 133 to effect the movement of the face-plate contact-making arms to the succeeding contact point in a counter-clockwise direction, in the manner already explained. In this new or fifth position of the arms, the control of regulator 85 is returned to generator unit A, since the contact-making arms 127 and 128 of face plates 122 and 123 are in engagement with contact points $aa$ and $aa'$ which are respectively joined with points $a$ and $a'$ by means of conductors 260 and 261.

Assuming the load demand on the main power circuit to continue to decrease, regulator 85 operates governor-adjusting motor 75 of generating unit A in the load-lowering direction by completing a circuit identical to the one already traced with the exception that connection of conductor 215 with contact-making arm 127 of face plate 122 is effected through contact point $aa$ and conductor 260 instead of through contact point $a$.

When input-control valve 45 has been closed to a position in which contact member 152 carried thereby engages low-input member 155, there is set up a circuit for effecting a transfer of the regulator control to unit B. This circuit extends from positive conductor 30, through conductors 146 and 217, contact members 152 and 155, conductor 262, contact point 263 and contact-making arm 126 of face plate 121, and the operating winding of relay 173 back to negative conductor 31. Thus energized, motor-control relay 173 causes the face-plate contact-making arms to be operated, by means of motor 133, to the succeeding contact-point positions in the counter-clockwise direction.

In this new or sixth position, the regulator 85 is in control of generating unit B, since contact-making arms 127 and 128, of face plates 122 and 123, engage contact members $bb$ and $bb'$, respectively, which are joined with contact points $b$ and $b'$ by means of conductors 264 and 265, respectively.

A continued decrease in power demand causes regulator 85 to lower the prime-mover input of generating unit B by completing a circuit for energizing governor-adjusting motor 80, which is identical with the one previously traced with the exception of the fact that the connection from conductor 234 to contact-making arm 127 of face plate 122 is made through contact point $bb$ and conductor 264 instead of through contact point $b'$. When the input-control valve of prime mover 16 of unit B has been closed to the point at which contact member 156 engages low-input member 168, there is established a circuit for transferring the regulator control to generating unit C, which circuit extends from positive conductor 30 through conductors 147 and 236, contact members 156 and 168, conductor 266, contact point 267 and contact-making arm 126 of face plate 121 and thence through the winding of motor-control relay 173 to negative conductor 31.

Thus energized, relay 173 causes motor 133 to move the face-plate contact-making arms to the succeeding contact point position in the counter-clockwise direction. In this new or seventh position, the frequency regulator 85 is in control of generating unit C, since contact-making arms 127 and 128, of face plates 122 and 123, are in engagement with contact points $cc$ and $cc'$, which are respectively joined with joints $c$ and $c'$ by means of conductors 270 and 271.

Assuming the load demand continues to decrease, the regulator 85 will be caused to operate governor-adjusting motor 81 of unit C in a load-lowering direction by establishing a circuit which is identical with the one already traced with the exception that connection from conductor 243 to contact-making arm 127 of face plate 122 is made through contact point $cc$ and conductor 270 instead of through contact point $c$.

When the input-control valve 42 has been closed to the position in which contact member 157 engages low-input member 169, there is established a circuit for effecting a transfer of regulator control to unit D, which circuit extends from positive conductor 30, through conductors 148 and 245, contact members 157 and 169, conductor 273, contact point 274 and contact-making arm 126 of face plate 121 and thence through the winding of relay 173 to negative conductor 31. Thus energized, motor-control relay 173 causes motor 133 to move the face-plate contact-making arms to the succeeding contact point position in the counter-clockwise direction.

In this new or eighth position, regulator 85 is in the control of generating unit D, since contact-making arms 127 and 128 respectively engage contact-points $dd$ and $dd'$, which are connected with contact-points $d$ and $d'$ by means of conductors 276 and 277, respectively.

Should the load demand continue to decrease, regulator 85 will act upon the governor-adjusting motor 82 of generating unit D by completing an energizing circuit which is identical with the one already traced with the exception that connection from conductor 252 to contact-making arm 127 of face-plate 122 is made through contact-point $dd'$ and conductor 276 instead of contact-point $d'$. Thus energized, motor 82 adjusts the governor of prime mover 22 in a manner that the input control valve 48 is moved to the nearly-closed position in which contact member 158, carried by the valve, engages member 170.

Once this position has been reached, it is apparent that further load decrease of unit D will be impossible and that one limit of frequency regulation of the system has been obtained, since all of the generating units are operating at their low value of load.

Thus no further transfer of the regulator control is desired for continuing decrease in load demand or increase in system frequency. Although a circuit may be set up by the closure of the last-named set of valve-operated contacts on unit D, it is desirable that this circuit be rendered ineffective in so far as causing a transfer is concerned, although it may be utilized for indicating or other purposes not comprehended by the scope of the present invention. Thus, for example, means for shutting down the generating units or otherwise indicating their low-load condition may be provided. Such means are schematically indicated in the circuit referred to at 282, in Fig. 2. Energization of this circuit is prevented from transferring the regulator control because of the action of limit switch 227.

The circuit mentioned extends from positive conductor 30 through conductors 149 and 254, engaged contact members 158 and 170 of unit D input-control valve, conductor 280, indicating device 282, contact point 281 and contact-making arm 126 of face plate 121 and thence through the winding of motor-control relay 173 to negative conductor 31.

In addition to device 282 being energized, motor-control relay 173 is also caused to actuate contact member 176 upwardly completing an energizing circuit for motor 133 which extends, as hereinbefore traced, from positive conductor 30, through conductor 225, armature winding 134 and field winding 135 of motor 133, conductor 226, engaged contact members 286 and 287 of limit switch 227, conductor 228, contact members 176 of relay 173 and conductors 229 and 230, back to negative conductor 31.

Thus energized, motor 133 starts to rotate in the direction to move the face-plate contact making arms in the counter-clockwise direction. This movement continues for but a short distance when member 285, carried by contact-making arm 128, of face plate 123, moves into engagement with limit switch 227 and causes contact members 286 and 287 to separate. This separation interrupts the motor-energizing circuit, and thus makes further operation of the motor in the given direction impossible. Such being the case, the contact making arms of the phase plates are prevented from moving away from the eighth contact point in the counter-clockwise direction, regardless of the position of the generating-unit input-control valves.

The operations of the transfer system so far described have been assumed to proceed in a continuous manner from a condition in which all of the generating units are operating at full load to a condition in which all of the units are operating at low or minimum load. For similar purposes of explanation, it will now be assumed that, starting from this last-named condition, the load demand on the power circuit supplied by the several generating units is caused to increase to the extent that the full rated capacity of all of the units will be required to supply it.

Starting then from a condition in which units A, B, C and D are operating at minimum load values, the frequency regulator 85 is in control of unit D, as has been seen from the explanation just completed. Such being the case, an increase in load demand, which tends to lower the frequency of the system, acts upon frequency regulator 85 in such manner that contact-carrying member 99 is moved downwardly to a position in which contact member 103 engages with member 109 and thereby completes a load-raising energizing circuit for governor-adjusting motor 82 of unit D. This circuit extends from positive conductor 30, through conductor 149, armature winding 250 and field winding 290 of motor 82, conductor 291, contact point $dd'$ and contact-making arm 128 of face plate 123, conductor 141, contact members 103 and 109 of regulator 85, contact-carrying arm 99 of the regulator, conductor 143, member 340, conductor 341, member 342, and conductor 343 back to negative conductor 31.

Thus energized, motor 82 adjusts the governor of prime mover 22 in the speed raising direction, which causes input-control valves 48 to be opened. When the opening attains an intermediate value, contact member 158, carried by the valve, engages with member 156 thus completing a circuit which acts to transfer the regulator control to unit C. This circuit extends from positive conductor 30 through conductors 149 and 254, valve-actuated contact members 158 and 166, conductor 255, contact point 293 and contact-making arm 125 of face plate 120, conductor 294, engaged contact members 206 and 207 of time-delay relay 182, conductor 295, the winding of motor-control relay 172, and conductor 296 back to the negative conductor 31.

Thus energized, relay 172 actuates its contact members upwardly completing, through member 175 an energizing circuit for face-plate operating motor 183 which extends from positive conductor 30 through conductor 225, armature winding 134 and field winding 136 of motor 133, conductor 298, limit switch 300, conductor 301, contact member 175 of relay 172, conductors 229 and 230, back to negative conductor 31.

Thus energized, motor 133 operates the contact arms of the face-plates in a clockwise direction to the succeeding contact points. As contact-making arm 125 of face plate 120 leaves contact point 293, the circuit for energizing motor-control relay 172 is interrupted, energization and operation of motor 133 is discontinued, and the contact-making arms are brought to rest on the succeeding contact points mentioned.

In this new position, in which contact-making arms 127 and 128 of face plates 122 and 123 are respectively, in engagement with contact points $cc$ and $cc'$, the regulator 85 is in control of generating unit C.

Continued increase in power demand causes regulator 85 to complete, through contact members 103 and 109, a circuit for energizing governor-adjusting motor 81 of unit C in the speed and load raising direction. This circuit extends from positive conductor 30 through conductor 148, armature winding 241 and field winding 303 of motor 81, conductor 304, contact point $cc'$ and contact-making arm 128 of phase plate 123, conductor 141, contact members 109 and 103 of regulator 85 and conductor 143, back to negative conductor 31.

Thus energized, motor 81 adjusts the governor of prime mover 19 in a manner that input-control valve 47 is caused to open. When the opening reaches the intermediate value, valve-carried contact member 157 engages member 165 and completes a circuit for effecting a transfer of regulator control to generating unit B. This circuit extends from positive conductor 30, through conductors 148 and 245, contact members 157 and 165, conductor 246, contact point 306 and contact-making arm 125 of face plate 120 and thence through the winding of motor-control relay 172 to negative conductor 31 through the circuit hereinbefore traced.

Thus energized, relay 172 moves its contact members to the actuated position and completes the energizing circuit for face-plate operating motor 133 which has been traced hereinbefore. Motor 133 thus moves the contact-making arms to the succeeding contact point position, in a clockwise direction, in the manner already described.

In this new position, regulator 85 is in control of generating unit B. Further increase in load demand causes the regulator to complete an energizing circuit for operating governor-adjusting motor 80 of unit B in a load-raising direction, which circuit extends from positive conductor 30, through conductor 147, armature winding 232 and field winding 308 of motor 80, conductor 309, contact point $bb'$ and contact-making arm 128 of face-plate 123, conductor 141, and thence through regulator 85 back to negative conductor 31.

Thus energized, motor 80 causes input-control valve 46 of prime mover 16 to be opened, and when valve-carried contact member 156 engages intermediate-load member 164, there is set up a circuit for effecting the transfer of regulator control to generating unit A. This circuit extends from positive conductor 30, through conductors 147 and 236, contact members 156 and 164, conductor 237, contact point 311 and contact-making arm 125 of face plate 120 and thence through the winding of relay 172 back to negative conductor 31.

Energization of relay 172 causes motor 133 to move the face plate contact arms to the succeeding contact points in a clockwise direction. In this new position of the arms, regulator 85 is in control of generating unit A.

The continued increase in load demand causes the regulator to complete a circuit for energizing governor-adjusting motor 75 of prime mover 11 in the load raising direction, which circuit extends from positive conductor 30 through conductor 146, armature winding 76 and field winding 77 of motor 75, conductor 313, contact point $aa'$ and contact-making arm 128 of face plate 123, conductor 141, and thence through regulator 85 back to negative conductor 31.

Thus energized, motor 75 causes the input-control valve 45 to be opened, and when the intermediate position is reached, contact member 152, carried by the valve, engages with member 154 to complete a circuit for effecting the transfer of regulator control to unit D. This circuit extends from positively energized conductor 217, contact members 152 and 154, conductor 218, contact point 314 and contact-making arm 125 of face plate 120, conductor 294 and thence through the winding of relay 172, back to negative conductor 31.

Thus energized, relay 172 causes motor 133 to advance the contact-making arms of the face plates to the succeeding point in a clockwise direction. In the new position, regulator 85 is in control of generating unit D. Continuing increase in power demand causes the regulator to complete a load-raising energizing circuit for governor-adjusting motor 82 of prime mover 22 which is the same as the one hereinbefore traced with the exception that connection of conductor 291 to contact-making arm 128 of face plate 123 is made through conductor 277 and contact point $d'$ instead of through contact point $dd'$.

Thus energized, motor 82 causes input-control valve 48 of the prime mover 22 to be opened, and when the valve-carried contact member 158 engages member 162 in the completely open position of the valve, there is established a circuit for effecting a transfer of regulator control to unit C. This circuit extends from positive conductor 30, conductors 149 and 254, contact members 158 and 162, conductor 318, contact point 319 and contact-making arm 125 of face plate 120 and thence through the winding of relay 172 to negative conductor 31.

Motor control relay 172 thus causes motor 133 to move the contact-making arms of the face plates to the succeeding contact point in a clockwise direction. In this new position, regulator 85 is in control of generating unit C. Continuing increase in load demand causes regulator 85 to establish a load-increasing energizing circuit for governor-adjusting motor 81 of unit C, which is the same as the one hereinbefore traced except that connection from conductor 304 to contact-making arm 128 of face plate 123 is made through contact point $c'$ and conductor 271 instead of through contact point $cc'$.

Thus energized, governor-adjusting motor 81 causes input-control valve 47 of prime mover 19 to be opened, and when the completely opened position is reached, valve-carried contact member 157 engages the member 161 to establish a circuit for effecting a transfer of regulator control to the generating unit B. This circuit extends from positive conductor 30, through conductors 148 and 245, contact members 157 and 161, conductor 321, contact point 322 and contact-making arm 125 of face plate 120, and thence through the winding of motor-control relay 172 back to negative conductor 31.

Thus energized, relay 172 causes the motor 133 to move the contact-making arms of the face plates in a clockwise direction to the succeeding contact point position, in which regulator 85 is in control of the generating unit B.

Continuing increase in load demand causes the regulator to set up an energizing circuit for governor-adjusting motor 80 of unit B to effect recalibration in a load raising direction, which circuit is identical with the one hereinbefore traced with the exception that the connection from the conductor 309 to the contact-making arm 285 of face plate 123 is made through contact point $b'$ and conductor 265 instead of through contact point $bb'$.

Thus energized, motor 80 causes input control valve 46 of prime mover 16 to be opened. When the completely open position is reached, valve-carried contact member 156 engages the member 160 to complete a circuit for effecting the transfer of the regulator control to the generating unit A. This circuit extends from positive conductor 30 through conductors 147 and 236, contact members 156 and 160, conductor 325, contact point 326, and contact-making arm 125 of face plate 120, and thence through the winding of motor-control relay 172 back to negative conductor 31.

Thus energized, the relay 172 causes the motor 133 to move the face-plate arms to the succeeding or limiting position in the clockwise direction. In this new position, the regulator is in control of the generating unit A. Assuming that the load demand continues to increase, the regulator 85 sets up a load-raising energizing circuit for governor-adjusting motor 75 which is identical with the one hereinbefore traced except that the connection from the conductor 313 to the contact-making arm 128 of face plate 123 is made through contact point $a'$ and conductor 261 instead of contact point $aa'$.

Should the input-control valve 45 of unit A be completely opened and valve-carried contact member 152 engage with member 153, there is established a circuit which may be utilized for indicating or other purposes and, although this circuit also energizes motor-control relay 172, it is desirable that no further transfer of regulator control be effected thereby, since the second limit of frequency regulation has been reached, all of the generating units operating at full capacity.

The circuit mentioned extends from positive conductor 30, through conductors 146 and 217, contact members 152 and 153, conductor 328, an indicating or other like device 330, contact point 329 and contact-making arm 125 of face plate 120 and thence through relay 172 to negative conductor 31. The device 330 mentioned may function when thus energized to start up additional generating units (not shown) or merely serve to show that the units already in service are fully loaded.

Thus also energized, relay 172 acts to cause motor 133 to move the face-plate contact-making arms in a clockwise direction by completing a circuit which includes limit switch 300. Further movement of the contact-making arms causes limit switch 300 to be opened and thus interrupts the motor-energizing circuit and prevents further movement of the face-plate arms in the clockwise direction regardless of the position of the valve-operated contacts of the generating units.

The operations described have assumed a large change in load-demand, and, while such a large range of regulation will not frequently be encountered in practice, the several operations have been so explained for analyzing the individual operations involved in the program sequence of the illustrated embodiment of our invention. It will be apparent from a consideration of these operations that, when the generating units are operating at any intermediate load point between the maximum and minimum capacity limits mentioned, an increase or decrease in the load demand will cause the transfer operations to proceed from the particular point in accordance with the program outlined. Thus, for example, let it be assumed that all of the units A, B, C and D are operating at the intermediate value of load and that the regulator 85 is in control of unit A. For such a condition, the face-plate contact-making arms 127 and 128, of face-plates 122 and 123, are in engagement with contact points aa and aa', respectively, and the input-control valve 45 of prime mover 11 may be in such position that the valve-carried contact member 152 is intermediate between mid-position member 154 and low-load position member 155.

A rise in frequency of the voltages acting in the main-power circuit causes the regulator 85 to complete a circuit for energizing the governor-adjusting motor 75 of the unit A in the load-lowering direction. This circuit has already been traced in detail. In the event that the load-lowering adjustment of the unit A continues until the valve has been closed to a position in which contact member 152 engages with member 155, there is initiated a control-transfer operation for transferring the regulator control to unit B, which operation has also been completely explained.

It is desirable that some arrangement be employed for preventing the immediate return of this transfer operation, as has already been mentioned in an earlier part of this specification.

As previously explained in part, a time-delay relay 182 performs such a function, in the case under consideration, by moving to the actuated position upon operation of the load-lowering motor-control relay 173, by virtue of the fact that the normally maintained short-circuit about the operating winding 202 of the time-delay relay 182 is removed by the opening of the circuit through the contact members 204 carried by the motor-control relay 173. In moving to its energized position, the relay 182 separates the contact members 206 and 207 in the control circuit of the load-raising motor-control relay 172 and, because of the time-delay-reopening characteristic of the relay 182 which has been explained, this circuit is maintained in the interrupted condition for a period of time sufficient to allow the newly-assigned generating unit to be brought into stable operation or control by the frequency regulator. After such a time delay, the relay 182 reestablishes the control circuit of the load-raising motor-control relay 172, and thus permits a control transfer to be made from the unit B to the unit A, should operating conditions call for it.

In a similar manner, let it be assumed that when all of the generating units are carrying intermediate loads and when the regulator control is assigned to unit A, which is operating between intermediate and low-load value positions, a decrease in the frequency of the system occurs. This decrease causes the regulator 85 to complete a load-raising energizing circuit for governor-adjusting motor 75 of unit A, and in the event that this energization continues until the input control valve 45 of prime mover 11 has been opened to the intermediate position, in which valve-carried contact 152 engages contact member 154, there will be initiated a transfer operation which shifts the regulator control to unit D in the manner already explained.

This transfer operation, resulting from the actuation of load-raising motor-control relay 172, removes the short-circuit normally maintained about the operating winding 186 of time-delay relay 180, and causes this relay to immediately move its armature to the right, thereby separating contact members 191 and 192, which are included in the energizing circuit of load-lowering motor-control relay 173. As has been explained, this new position of the time-delay relay is maintained for a period sufficient to allow the newly assigned generating unit to be brought into stable control by the regulator and thus prevents the equipment from reversing the transfer operation until such a predetermined time has elapsed.

It will be apparent that this transfer-reverse time-delay feature is effective for all transfers, as well as for those which have just been described in detail, and that it is a feature which greatly contributes to the practicability of the transfer system of our invention, since it reduces to a reasonable number the reversal of transfer operations which otherwise might, under certain conditions, become excessive.

It has likewise been pointed out that, during any transfer operation, the regulator control circuits are deenergized by the opening of one or the other of transfer-device-operating-motor control relay contact members 342 and 340. This expedient effectively prevents arcing when the contact-making arms of face-plates 122 and 123 are moved from one point to another as there can be no current flow through these devices during such transition periods.

Although our invention has been described employing an automatic regulator 85 which initiates the load-adjusting impulses, it will be apparent that instead of such an automatic device, a manually operable control switch may, if desired, be utilized to supply load-changing impulses to the governor-adjusting motors of the several generating unit prime movers supervised by the automatic transfer system of our invention. Such manual control, which may in practice be used when it is desired that an operator regulate the power output of a station, may be combined with our transfer system in exactly the same manner as is the automatic regulator illustrated, for, insofar as the functioning of the transfer system itself is concerned, it is immaterial whether the adjusting impulses selectively routed thereby are initiated manually or by an automatic device of the type illustrated.

While we have shown and described a certain specific embodiment of our invention, we are fully aware that many modifications thereof are possible. Our invention, therefore, is not to be restricted except insofar as is necessitated by the prior art and by the spirit of the appended claims.

We claim as our invention:

1. In combination, a plurality of generating units disposed to supply a common power circuit, means for adjusting the load carried by each of said units, regulating means responsive to an electrical condition of said circuit, switching means disposed to selectively assign the control of said regulating means to the load-adjusting means of any one of said units, and means for operating said switching means in accordance with the loading of the several units in a manner that control transfer from one unit to another will be made according to a predetermined unit-loading schedule.

2. In combination, a plurality of electrical machines connected to a common power circuit, means for adjusting the load carried by each machine, regulating means responsive to an electrical condition of said circuit, switching means for selectively assigning the control of said regulating means to the load-adjusting means of any one of said machines, and means for operating said switching means in accordance with the loading of the several machines in such manner that control transfer from one machine to another will be made according to a predetermined program.

3. The combination of a power circuit, a plurality of electrical-machine units connected thereto, means for adjusting the load carried by each unit, regulating means responsive to an electrical condition of said circuit for controlling the operation of said load-adjusting means, means for selectively assigning the control of said regulating means to the load-adjusting means of any one of said machine units, and means, responsive to the loading of the controlled unit, for transferring the said control from one to another of said machine units in accordance with a given program.

4. The combination of a power circuit, a plurality of electrical-machine units connected thereto, means for adjusting the load carried by each unit, regulating means responsive to an electrical condition of said circuit for controlling the operation of said load-adjusting means of one of said units, and switching means for transferring the control of said regulating means from one to another of said units in accordance with a predetermined unit-loading schedule.

5. The combination of a power circuit, a plurality of electrical-machine units connected thereto, means for adjusting the load carried by each unit, regulating means, responsive to an electrical condition of said circuit, disposed to control the operation of said load-adjusting means of one of said units, and means for transferring, in accordance with a definite schedule, the regulating means control from one unit to another upon predetermined changes in the load of the unit under control.

6. The combination of a power circuit, a plurality of electrical generators connected to said circuit, a prime mover for driving each of said generators, a speed-responsive governor associated with and disposed to control the input of each of said prime movers, means for adjusting the setting or response characteristics of each governor, a regulator, responsive to an electrical condition of said circuit, for controlling the operation of one of said governor-adjusting means, and means for transferring the regulator control from one prime mover to another after a predetermined change in governor setting of the prime mover under control.

7. In a system comprising a power circuit, a plurality of alternating-current generators connected to said circuit, a prime mover for driving each of said generators, a speed-responsive governor associated with and disposed to control the input of each of said prime movers, means for adjusting the setting or response characteristics of each governor, and a regulator responsive to the frequency of said circuit for controlling the operation of one of said governor-adjusting means, and means for transferring the regulator control from one prime mover to another after a predetermined change in the governor setting, said means acting to so control the regulator transfer that the governor settings of each of the several prime movers will be varied in a predetermined sequence for changing power-circuit load conditions, complete maximum-to-minimum load change in the setting of any one governor requiring a plurality of transfers in accordance with a predetermined program.

8. In a system comprising a power circuit, a plurality of electrical generators connected to said circuit, a prime mover for driving each of said generators, a valve for controlling the power input to each of said prime movers, means for actuating said valves, and regulator means responsive to an electrical condition of the circuit for controlling the operation of one of said valve-actuating means, and means for transferring the regulator control from one prime mover to another in a predetermined sequence, said means comprising a plurality of contact-making means associated with each valve disposed to initiate a transfer of the regulator control when the valve adjustment exceeds predetermined limits.

9. In a system comprising a power circuit, a plurality of electrical generators connected to said circuit, a prime mover for driving each of said generators, a speed-responsive governor disposed to actuate a valve for controlling the flow of motive fluid supplied to each of said prime movers, means for adjusting the setting of each governor, regulator means responsive to the frequency of said circuit for actuating the governor-adjusting means of one of said prime movers, means for transferring the regulator control successively among the several prime movers in a predetermined sequence, and a plurality of contact-making means associated with each valve disposed to control the operation of the said regulator-transferring means, the actuation of two successive contact-making means on each valve initiating different transferring operations.

10. In a system comprising a power circuit, a plurality of electrical generators connected to the circuit, a prime mover for driving each generator, means for adjusting the input of each prime mover, and a regulator, responsive to an electrical quantity of said circuit, for controlling the operation of the input-adjusting means of one of said prime movers, means for transferring the regulator control among the prime movers in accordance with a predetermined program, contact-making devices associated with each input-adjusting means for initiating a transfer of regulator control upon a predetermined change in input adjustment, and means for preventing a reversal of any regulator-control transfer operation after its operation in a given direction until after a predetermined time has elapsed.

11. In a regulating system for a plurality of alternating-current generating units which are disposed to supply a common power circuit, the combination, with load-adjusting means for each of said units and a frequency regulator disposed to control the operation of the said adjusting means of any one of the units, of means for transferring in a predetermined sequence the regulator control from one unit to another, and load-responsive means, associated with each unit, disposed to initiate a control-transfer operation when the regulator causes the loading of the unit under control to vary beyond predetermined limits.

12. In a regulating system for a plurality of alternating-current generating units which are disposed to supply a common power circuit, the combination, with load-adjusting means for each of said units and a frequency regulator disposed to control the operation of the said adjusting means of any one of the units, of means for transferring in a predetermined sequence the regulator control from one unit to another, a load-responsive means associated with each unit and disposed to initiate a control-transfer operation when the regulator causes the loading of the unit under control to vary beyond predetermined limits, and means for preventing a reversal of a control-transfer operation until a predetermined time has elapsed after its completion.

13. In a system for automatically transferring, according to a given program, the control of a regulator from one to another of a plurality of parallel-operated electrical machines as a condition of the machine controlled by the regulator is caused to change beyond predetermined limits, said system comprising two relays respectively disposed to control the operation of regulator-control-transfer apparatus in forward and reverse-program directions, and means for selectively actuating said relays, the combination with each of said control-relays of an operation lock-out device disposed to receive an actuating impulse from the operation of the other of said control-relays, each of said devices being disposed, upon actuation, to render inoperative for a predetermined period of time the associated control relay to thus make impossible a reversal of a control-transfer operation until a given time after its completion.

14. In a system for automatically transferring, according to a given program, the control of a regulator from one to another of a plurality of parallel-operated electrical machines as a condition of the machine controlled by the regulator is caused to change beyond predetermined limits, said system comprising two relays respectively disposed to control the operation of the regulator-control-transfer apparatus in a forward-and a reverse-program direction, and means for selectively actuating said relays, the combination with each of said control-relays of a quick-actuating time-delay-return relay disposed in its actuated position to render inoperative the associated control relay, the time-delay relay acting upon the forward-program-control relay being disposed to receive an actuating impulse upon the actuation of the reverse-program-control relay, and the time-delay relay acting upon the reverse-program control relay being disposed to receive an actuating impulse upon the actuation of the forward-program-control relay, said time-delay relays thus functioning to make impossible a reversal of a control-transfer operation until after a predetermined time from its completion.

15. In a system comprising a power circuit, a plurality of electrical generators connected to the circuit, a prime mover for driving each generator, means for adjusting the input of each prime mover, and a regulator, responsive to an electrical quantity of said circuit, for controlling the operation of the input-adjusting means of one of said prime movers, means for transferring the regulator control among the prime movers in accordance with a predetermined program, contact-making devices associated with each input-adjusting means for initiating a transfer of regulator control upon a predetermined change in input adjustment, and means for deenergizing the said regulator control during the time that a transfer operation is in progress.

16. In combination with a plurality of parallel-operated electrical machines having load-adjusting means operable in the load-raising and load-lowering directions by the respective completion of one or the other of two circuits, and a regulator disposed to selectively complete said circuits for one of said machine-adjusting means, a system for automatically transferring the control of said regulator from one to another of said machines as the regulated-machine loading is caused to change beyond predetermined limits, said system comprising a double-circuit switching device having a plurality of selectively-engageable contact-making means connected in said circuits intermediate the regulator and the load-adjusting means of the several machines in a manner that operation of said device in each direction effects a transfer of regulator control among said machines in a given sequence, and means for operating said switching device in accordance with predetermined machine-loading conditions.

17. In combination with a plurality of parallel-operated electrical machines having load-adjusting means and a regulator disposed to control the adjusting means of one of said machines, a system for automatically transferring the control of said regulator from one machine to another as the controlled-machine loading is caused to change beyond predetermined limits, said system comprising means for selectively connecting the regulator with each of the several machine-load-adjusting means in a given consecutive order, means for operating said regulator-control machine-selecting means in one direction or the other when one or the other of two transfer-control circuits are completed, load-responsive contact-making means associated with each machine, a double-circuit switching device, disposed to be operated in parallel with said control-selecting means, having a plurality of selectively-engageable contact-making means connected in said transfer-control circuits intermediate the said operating means and the load-responsive contact-making means in a manner that operation of said device in each direction effects a change of transfer-control among the said several machines in a given sequence, and thus permits engagement of the load-responsive contact-making means of the regulator-controlled machine to complete one or the other of said two transfer-control circuits to transfer control to another machine.

18. In a system comprising a plurality of electrical generators disposed for parallel operation, motive means for driving each of said generators, a governor for controlling the output of each of said motive means, and a regulator, disposed to adjust the load settings of said governors, the combination of means for assigning the regulator control to one of said motive means and for transferring it from one to another when the loading of the motive means under control reaches a given value, said last-named means being disposed to selectively adjust the settings of the several governors to effect changes in the total output of the motive means, increments in said output changes thus being progressively routed among the motive means of the several generators in accordance with a predetermined program.

19. In combination, a plurality of electrical generating units disposed for parallel operation, means for adjusting the loading of each of said units, a regulator disposed to control the operation of the adjusting means of any one of the units, means for transferring in a predetermined sequence the regulator control from one unit to another, and load-responsive means, associated with each unit, disposed to initiate a control-transfer operation when the said regulator causes the loading of the unit under control to vary beyond predetermined limits.

20. In combination, a system comprising a plurality of parallel-operated fluid-driven prime movers each of which has a governor for controlling the motive-fluid input, electrical control circuits for adjusting the load settings of said governors, and means for assigning the control of said load-adjusting circuits to one of said prime movers and for transferring it from one to another when the loading of the prime mover under control reaches given values, said means thus being disposed to permit selective adjustment of said governor settings in order to effect changes in the total output of the several prime movers, increments of said load changes being progressively routed among the prime movers in accordance with a predetermined program.

21. In combination, a plurality of machines disposed for parallel operation, means for adjusting the loading of each of said machines, a regulator for controlling the operation of said load-adjusting means, a multi-position selector switch for assigning the regulator control to the said adjusting means of any one of the machines, means for actuating said selector switch, and contact members actuated in accordance with the loading of each machine for controlling the operation of said selector-switch actuating means.

22. A system of load-distribution supervision for a plurality of parallel-operated machines comprising equipment for transferring, in accordance with a predetermined schedule, the control of a load-adjusting regulator from one machine to another upon the engagement of load-responsive contact members associated with the machine under regulator control.

JOHN H. ASHBAUGH.
RALPH A. GEISELMAN.